UNITED STATES PATENT OFFICE

HENRY A. GARDNER, OF WASHINGTON, DISTRICT OF COLUMBIA

NONSHATTER GLASS AND PROCESS OF MAKING THE SAME

No Drawing.   Application filed May 28, 1930.   Serial No. 456,809.

This invention relates to reinforced or laminated glass of the kind wherein a plurality of sheets of glass are united into one composite body by an interposed layer, or layers, of nonbrittle adhesive binder with or without an added reinforcing material, and to a process of making the same.

Heretofore, in the preparation of reinforced or laminated glass, non-brittle reinforcing materials such as celluloid, pyroxylin and other cellulose ester or ether compositions have been used, adhesion between glass and the reinforcing materials being effected by the use of adhesives such as gelatin, dextrin, colophony, castor oil, and the like. Usually or often the component parts of the product are caused to unite physically by the aid of pressure or of pressure and heat. In products such as have been alluded to in the foregoing, the adhesive is one of the most important constituents.

I have found that very desirable properties are possessed by a laminated glass produced by pressing together sheets of glass between which has been interposed a layer of adhesive comprising in substantial amount a resin produced by the chlorination of diphenyl. This resin, hereinafter referred to as "chlorinated diphenyl" or "chlorinated diphenyl resin", may range from a hard, solid, mass to a soft, sticky, adhesive, mass. The commercial product chlorinated to about 60%, i. e., containing about 60% of chlorine, is illustrative. When two sheets of glass are pressed together upon an intervening layer of this resin, or of an adhesive composition containing this resin admixed with another adhesive which may, for example, be a resin, or upon a cellulosic reinforcing sheet with interposed coating of the resin or resin composition, excellent adhesion, clarity, and freedom from discoloration by sunlight are obtained.

The invention may be illustrated by the following examples:

*Example 1.*—Two sheets of plate glass, each one-eighth inch thick, are warmed, and upon their opposing surfaces a thin layer of molten chlorinated diphenyl is poured. The two sheets of glass are then pressed together.

*Example 2.*—A sheet of regenerated cellulose is coated on both sides with chlorinated diphenyl resin, or with a solution made by dissolving chlorinated diphenyl resin in an equal weight of toluol, the so-treated sheet is interposed between sheets of glass, and the superimposed sheets are pressed together, preferably after first having been warmed to the softening point of the resinous adhesive. In the case where toluol is used, evaporation of the toluol leaves a film of chlorinated diphenyl, upon the glass, comparable to that obtained by applying the resin in the absence of a solvent.

*Example 3.*—In either of the procedures described in Example 2, a sheet of clear celluloid may be substituted for the sheet of regenerated cellulose as the reinforcing component of the laminated glass product. Excellent adhesion is obtained.

As will be obvious to one skilled in this art, I may apply the adhesive composition comprising or consisting of chlorinated diphenyl resin to the opposing surfaces of the glass sheets, rather than to the surfaces of the reinforcing sheet, or I may apply films of the adhesive to the opposing surfaces of the glass sheets and to surfaces of the reinforcing sheet.

Chlorinated diphenyl resin is compatible with natural resins, such as, for example, rosin, copal, dammar, and the like, and also with synthetic resins such, for instance, as resins of the phenol-aldehyde and glyptal types, resin esters, aryl sulfamid-aldehyde resins, and the like. In some cases it may be found desirable to use adhesive substances obtained by incorporating advantageously by heating or fusion, chlorinated diphenyl resin into one or more other resins; either natural or synthetic, as illustrated in the following example:

*Example 4.*—Phthalic acid anhydride, 100 parts by weight, is heated with glycerin, 32 parts by weight, to a temperature of about 190° C. To the resulting fluid mass is added, with stirring, 25 parts by weight of chlorinated diphenyl 50–60%. The resulting product, which is a clear, almost colorless, resin, is spread as a film over the opposing surfaces of the two warm sheets of glass and the sheets are then pressed together.

The same general effect is produced by thoroughly mixing solutions of chlorinated diphenyl and the other resin or resins, and filming the mixed solutions upon the glass, or, in case a reinforcing member is employed, upon the surfaces of the reinforcing sheet and/or upon the opposing surfaces of the glass sheets, allowing the solvent to evaporate, and thereafter uniting the coated sheets by pressure.

Chlorinated diphenyl likewise is compatible with certain solutions of cellulose esters and ethers. By reason of this fact I may incorporate the resinous adhesive into cellulosic material, and suitably form the product as the intervening layer between sheets of glass. Thus: I may prepare the laminated glass-product by pressing together two sheets of glass upon the opposing surfaces of which there has been coated a composition consisting essentially of chlorinated diphenyl resin, or the said resin in admixture with another resin either natural or synthetic, and the cellulose derivative. Or; I may use the composition just described as an adhesive layer between glass and a sheet of reinforcing material such, for instance, as regenerated cellulose. The following example is illustrative:

*Example 5.*—The opposing surfaces of the glass sheets which are to be laminated together are coated with a cement having the following composition:

| | Pounds |
|---|---|
| Low viscosity nitrocellulose | 25 |
| Di butyl phthalate | 8 |
| Tri cresyl phosphate | 7 |
| Chlorinated diphenyl resin | 15 |
| Ethyl acetate | 60 | and the so-treated sheets are, after brief drying, laminated together as described in the foregoing examples.

In the foregoing example, a reinforcing sheet of regenerated cellulose or the like may be employed, as in Example 2 above.

Heating during or after the pressing is desirable with the resinous adhesives containing some types of synthetic resins (e. g., phenol-aldehyde resin, alkyd resin, and others), in view of the fact that the reactions thereby brought about effect the formation of especially firm masses.

The non-shatter glass produced in accordance with the present invention is highly satisfactory, particularly with respect to transparency of the adhesive and reinforcing layer to ultraviolet light, and lack of tendency to break down or discolor or become cloudy. The transmission of ultraviolet light by chlorinated diphenyl, in a film 0.05 mm. in thickness, is represented in the following table of transmission:

| | | |
|---|---|---|
| 80% | at | λ3160 |
| 60% | at | 3145 |
| 40% | at | 3125 |
| 30% | at | 3123 |
| 20% | at | 3113 |
| 10% | at | 3103 |
| Limit of transmission | | ±3080 |

It is well known that ordinary plate glass shuts off practically all ultraviolet light having a wave length of less than 3200 but allows light of greater wave length to pass through. From the above it will be noted that the diphenyl resin allows the passage of practically all light of wave length above 3160. Resins which absorb light rays usually change in color rapidly, while those which transmit light rays usually remain light in color.

It is also of interest to note that the refractive index of the chlorinated diphenyl resin is in the neighborhood of 1.62. It is well known that the refractive index of plate glass is about 1.52. The fact that the refractive index of the said resin so closely approaches that of glass may explain why such great clarity is obtained with my product.

I claim:

1. As an article of manufacture, a composite body comprising a plurality of glass sheets firmly united together by means of a non-brittle composition containing chlorinated diphenyl.

2. As a new article of manufacture, a composite body comprising a plurality of glass sheets firmly united together by means of a non-brittle composition containing chlorinated diphenyl and an added adhesive.

3. As an article of manufacture, a composite body comprising a plurality of glass sheets firmly united together by means of a non-brittle composition containing chlorinated diphenyl and another resin.

4. As an article of manufacture, a composite body comprising a plurality of glass sheets firmly united together by means of a non-brittle composition containing chlorinated diphenyl alkyd resin.

5. As an article of manufacture, a composite body comprising a plurality of glass sheets firmly united together by means of a non-brittle composition containing chlorinated diphenyl, another resin, and a cellulosic compound.

6. As an article of manufacture, a composite body comprising a plurality of glass sheets firmly united together by means of a non-brittle composition containing chlorinated diphenyl, another resin, and a cellulose ester.

7. As an article of manufacture, a composite body comprising a plurality of glass sheets firmly united together by means of a non-brittle composition containing chlorinated diphenyl, another resin, and nitrocellulose.

8. As an article of manufacture, a composite body comprising a plurality of glass sheets firmly united together by means of a non-brittle composition containing chlorinated diphenyl, an alkyd resin, and nitrocellulose.

9. As an article of manufacture, a composite body comprising a plurality of glass sheets and a cellulosic reinforcing sheet between each two glass sheets, the several components being firmly united together by means of a non-brittle adhesive composition containing chlorinated diphenyl.

10. As an article of manufacture, a composite body comprising a plurality of glass sheets and a cellulosic reinforcing sheet between each two glass sheets, the several components being firmly united together by means of a non-brittle adhesive composition containing chlorinated diphenyl and an added adhesive.

11. As an article of manufacture, a composite body comprising a plurality of glass sheets and a cellulosic reinforcing sheet between each two glass sheets, the several components being firmly united together by means of a non-brittle adhesive composition containing chlorinated diphenyl and another resin.

12. As an article of manufacture, a composite body comprising a plurality of glass sheets and a cellulosic reinforcing sheet between each two glass sheets, the several components being firmly united together by means of a non-brittle adhesive composition containing chlorinated diphenyl and alkyd resin.

13. As an article of manufacture, a composite body comprising a plurality of glass sheets and a cellulosic reinforcing sheet between each two glass sheets, the several components being firmly united together by means of a non-brittle adhesive composition containing chlorinated diphenyl, another resin, and a cellulosic compound.

14. As an article of manufacture, a composite body comprising a plurality of glass sheets and a cellulosic reinforcing sheet between each two glass sheets, the several components being firmly united together by means of a non-brittle adhesive composition containing chlorinated diphenyl, another resin, and a cellulose ether.

15. As an article of manufacture, a composite body comprising a plurality of glass sheets and a cellulosic reinforcing sheet between each two glass sheets, the several components being firmly united together by means of a non-brittle adhesive composition containing chlorinated diphenyl, another resin, and nitrocellulose.

16. As an article of manufacture, a composite body comprising a plurality of glass sheets and a cellulosic reinforcing sheet between each two glass sheets, the several components being firmly united together by means of a non-brittle adhesive composition containing chlorinated diphenyl, an alkyd resin, and nitrocellulose.

17. As an article of manufacture, a composite body comprising a plurality of glass sheets and a regenerated cellulose reinforcing sheet between each two glass sheets, the several components being firmly united together by means of a non-brittle adhesive composition containing chlorinated diphenyl.

18. As an article of manufacture, a composite body comprising a plurality of glass sheets and a regenerated cellulose reinforcing sheet between each two glass sheets, the several components being firmly united together by means of a non-brittle adhesive composition containing chlorinated diphenyl, an alkyd resin, and nitrocellulose.

19. In the process of making a laminated glass product involving the building up of a composite body consisting of at least two sheets of glass with an interposed layer comprising an adhesive binder, the step which consists in using as the adhesive binder a composition comprising chlorinated diphenyl.

20. Process which comprises coating the opposing surfaces of two sheets of glass with an adhesive composition containing chlorinated diphenyl, joining the so-coated sheets of glass, and uniting them into a unitary whole by application of pressure.

In testimony whereof, I affix my signture.

HENRY A. GARDNER.